N. H. BORGFELDT.
Pulley.
No. 159,633.
Patented Feb. 9, 1875.
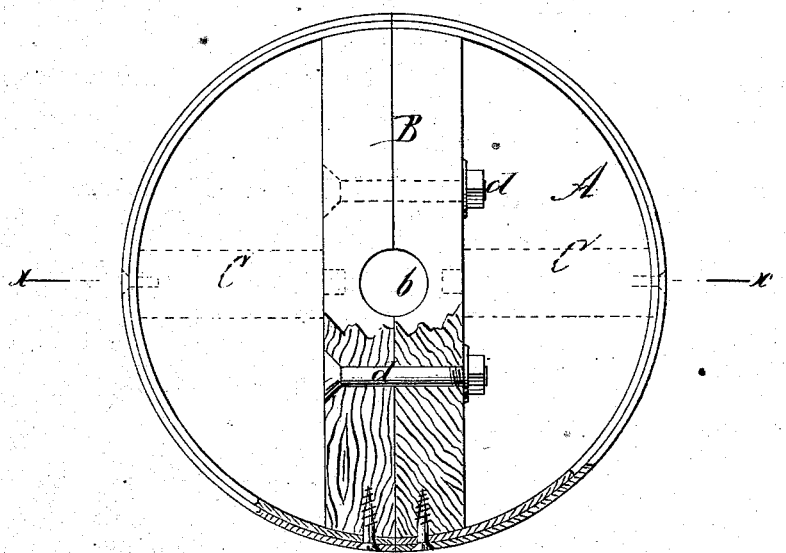
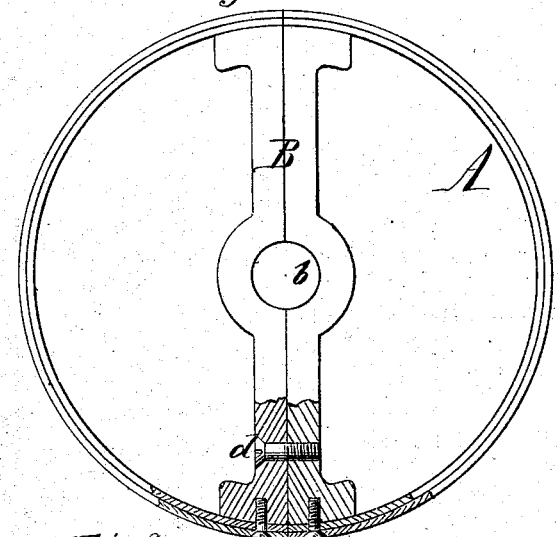
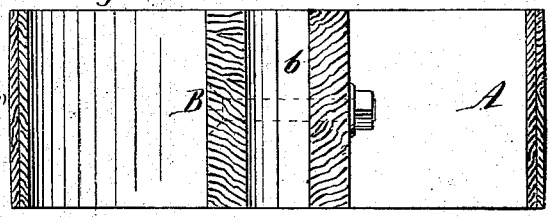

UNITED STATES PATENT OFFICE.

NICHOLAS H. BORGFELDT, OF NEW YORK, N. Y.

IMPROVEMENT IN PULLEYS.

Specification forming part of Letters Patent No. 159,633, dated February 9, 1875; application filed October 9, 1874.

*To all whom it may concern:*

Be it known that I, NICHOLAS H. BORGFELDT, of the city, county, and State of New York, have invented a new and useful Improvement in Pulleys; and I do hereby declare the following to be a full, clear, and exact description thereof, which will enable those skilled in the art to make and use the same, reference being had to the accompanying drawing forming a part of this specification, in which drawing—

Figure 1 represents a sectional side view of my pulley when made with a wooden center-brace. Fig. 2 is a similar view of the same, when made with a cast-iron center-brace. Fig. 3 is a transverse section of the same in the plane *x x*, Fig. 1.

Similar letters indicate corresponding parts.

This invention consists in a pulley, the rim of which is made of two or more layers of wood, which are firmly united by glue or other suitable cement, and which are brought to the required circular shape by pressing them against the inner circumference of a metallic ring, turned out to the required size. When the rim has been formed, it is strengthened by a central or diametrical brace, which is fastened to the rim by screws, and with which may be combined radial braces. Both the rim and the brace are then divided, so that a pulley is obtained which can be readily clamped to a shaft at any desired place.

In the drawing, the letter A designates a pulley, the rim of which is composed of two or more thin layers of wood, which are glued together and brought into the required shape by pressing them against the inner circumference of a metallic ring or mold, prepared for this purpose.

In practice, and particularly for large pulleys, I propose to make the rim A of a number of veneers, which are glued together so as to cross grains, whereby the firmness and durability of the rim is materially increased.

After the rim has been pressed in the required shape, I secure in the same a diametrical brace, B, which is fastened to the rim by screws *a a*, when the pulley is divided vertically through its center, to form two halves, which are clamped together by screw-bolts *d*, passing through both the diametrical braces B, as illustrated in the accompanying drawing.

This brace may be made of wood, as shown in Fig. 1, or it may be made of metal, as shown in Fig. 2, in which latter case the said brace is made in two parts prior to being secured in position.

In large pulleys, I propose to combine with this diametrical brace B, additional radial braces C, as shown in dotted lines in Fig. 1. These radial braces will be provided with dowel-pins at their inner ends, to engage with sockets in the diametrical brace, and their outer ends will be fastened to the rim by means of screws.

After the diametrical brace is secured in position, I place the pulley into a suitable chuck in a turning-lathe, and bore out the hole *b*, to fit the shaft on which the pulley is to be applied.

By making the pulley of wood in two halves, the same can be readily clamped to a shaft at any desired place, without disturbing said shaft or the pulleys already mounted thereon, and, owing to its great lightness, a large number of the same can be mounted on a shaft, and the shaft can be turned with great velocity without danger of producing a shaking or trembling motion. By these means a pulley is obtained which is very light and cheap.

The rim requires no turning, and, on account of its inherent elasticity it adapts itself closely to the belt; or, in other words, the belt hugs the rim of my pulley so that it is not liable to slip, and it will draw to its full power without sustaining any damage or injury.

On account of the great lightness of my pulleys, a large number of the same can be mounted on a shaft, and the shaft can be turned with great velocity without danger of producing a trembling or shaking motion.

When made in two halves, my pulley can be readily clamped to a shaft at any desired place without disturbing said shaft or the pulleys already mounted on it.

What I claim as new, and desire to secure by Letters Patent, is—

A pulley, formed in sections, the rims of which are composed of layers of wood placed one upon the other, and bent to the required shape, in combination with a diametrical brace made in sections, and adapted to be fastened together, substantially as described.

N. H. BORGFELDT.

Witnesses:
  W. HAUFF,
  E. F. KASTENHUBER.